US009463672B2

United States Patent
Mathonet et al.

(10) Patent No.: US 9,463,672 B2
(45) Date of Patent: Oct. 11, 2016

(54) PNEUMATIC TIRE TREAD WITH SIPES AND MOLD BLADE

(71) Applicant: The Goodyear Tire & Rubber Company, Arkon, OH (US)

(72) Inventors: Vincent Benoit Mathonet, Harze (BE); Daniel Scheuren, Arlon (BE); Philippe Joseph Auguste Muller, Champlon (BE); Frank Pierre Severens, Arlon (BE); Eric Nowak, Houffalize (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 468 days.

(21) Appl. No.: 13/971,333

(22) Filed: Aug. 20, 2013

(65) Prior Publication Data

US 2015/0053320 A1 Feb. 26, 2015

(51) Int. Cl.
*B60C 11/12* (2006.01)
*B29C 33/42* (2006.01)

(52) U.S. Cl.
CPC ............ *B60C 11/1218* (2013.04); *B29C 33/42* (2013.01); *B60C 11/1281* (2013.04); *B60C 2011/1213* (2013.04)

(58) Field of Classification Search
CPC ................. B60C 2011/12; B60C 2011/1204; B60C 2011/1209; B60C 2011/1218; B60C 2011/1222; B60C 2011/1231; B60C 2011/1263; B60C 2011/1281; B60C 2011/036; B60C 2011/0369; B60C 2011/0367; B60C 2011/0323; B60C 11/12; B60C 11/1204; B60C 11/1218; B60C 11/1222; B60C 11/1263; B60C 11/1281; B29C 33/42

USPC .............. 152/209.25, 209.18, 154.2, 209.21; 425/28.1, 35, 46
See application file for complete search history.

(56) References Cited

U.S. PATENT DOCUMENTS

| 4,154,564 A | * | 5/1979 | French | B29D 30/0606 425/28.1 |
| 5,385,189 A | | 1/1995 | Aoki et al. | |

(Continued)

FOREIGN PATENT DOCUMENTS

| EP | 0705721 B1 | 1/1999 |
| EP | 1207057 | 5/2002 |

(Continued)

OTHER PUBLICATIONS

European Search Report for Application Serial No. 14181214 dated Jul. 2, 2015.

*Primary Examiner* — Eric Hug
(74) *Attorney, Agent, or Firm* — June E. Rickey

(57) ABSTRACT

The invention provides a tire tread, the tread having at least one circumferentially extending or laterally extending main groove, the maximum radial depth of the at least one main groove defining a non-skid tread depth, the at least one main groove partially forming at least one tread element, the at least one tread element having a sipe therein, wherein the sipe has a first portion having a first and second opposed side, and a third side joining said first and second side, and said sipe further including a continuous tubular pathway bordering said first, second and third side. The invention further includes a blade for molding a tire, the blade comprising a first portion having a first and second opposed side, and a third side joining said first and second side, and said blade further including a continuous tubular pathway extending along the third side and partially extending along at least one of the first and second side.

14 Claims, 4 Drawing Sheets

(56) References Cited

U.S. PATENT DOCUMENTS

| | | | |
|---|---|---|---|
| 5,772,806 A | 6/1998 | Moriya | |
| 6,264,453 B1 | 7/2001 | Jacobs et al. | |
| 6,408,911 B1 * | 6/2002 | Tanabe | B29D 30/0606 |
| | | | 152/209.18 |
| 9,174,496 B2 * | 11/2015 | Dayet | B60C 11/1218 |
| 2009/0159167 A1 * | 6/2009 | Scheuren | B29D 30/0606 |
| | | | 152/209.18 |
| 2013/0164401 A1 | 6/2013 | Dusseaux | |

FOREIGN PATENT DOCUMENTS

| | | | |
|---|---|---|---|
| EP | 1533141 B1 | | 2/2008 |
| EP | 1782970 B1 | | 7/2010 |
| JP | 1-95913 | * | 4/1989 |
| JP | 01095913 | | 4/1989 |
| JP | 01101205 | | 4/1989 |
| JP | 2-241806 | * | 9/1990 |
| JP | 02241806 | | 9/1990 |
| JP | 2-303908 | * | 12/1990 |
| JP | 02303908 | | 12/1990 |
| JP | 04197809 | | 7/1992 |
| JP | 05254314 | | 10/1993 |
| JP | 06143943 | | 5/1994 |
| JP | 06320913 | | 11/1994 |
| JP | 07285303 | | 10/1995 |
| JP | 8-25361 | * | 1/1996 |
| JP | 0825361 | | 1/1996 |
| JP | 08048115 | | 2/1996 |
| JP | 2000043510 | | 2/2000 |
| WO | 2012152593 | | 11/2012 |

* cited by examiner

PNEUMATIC TIRE TREAD WITH SIPES AND MOLD BLADE

FIELD OF THE INVENTION

The present invention is directed to a pneumatic tire having sipes, and a blade for molding the tire tread. More particularly, the present invention is directed to a tire tread design and mold blade.

BACKGROUND OF THE INVENTION

Tires commonly utilize sipes in the tire tread for snow and wet traction. Metal blades are typically used to mold the sipes in the tire tread. As shown in FIG. 7a, these blades A are typically designed with a radiused edge B at the blade bottom in order to minimize the block tearing. However the tread block tends to tear at the vertical slit C formed in the sides of the tread block. As shown in FIG. 7B, block tearing is also problematic for blocks joined by tie bars, because the blade sharp edges tends to cut deep into the tread area located next to the tie bar, resulting in an sharp corner and high stress concentration. Also, when the blade is removed from the tire block tearing may occur, particularly at the edges of the tread block. Thus an improved blade and sipe geometrical configuration is desired, which alleviates all the disadvantages described above as well as a blade design that increases the blades resistance to bending.

SUMMARY OF THE INVENTION

The invention provides in a first aspect a tire tread, the tread having at least one circumferentially extending or laterally extending main groove, the maximum radial depth of the at least one main groove defining a non-skid tread depth, the at least one main groove partially forming at least one tread element, the at least one tread element having a sipe therein wherein the sipe has a first portion having a first and second opposed side, and a third side joining said first and second side, and said sipe further including a continuous tubular pathway bordering said first, second and third side.

The invention provides in a second aspect a blade for molding a tire, the blade comprising a first portion having a first and second opposed side, and a third side joining said first and second side, and said blade further including a continuous tubular pathway extending along the third side and partially extending along at least one of the first and second side.

DEFINITIONS

The following definitions are controlling for the disclosed invention.

"Blade" means a protrusion in a tire curing mold that forms part of the tread design. The protrusion forms a corresponding depression in the finished tire tread.

"Radial" and "radially" are used to mean directions radially toward or away from the axis of rotation of the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
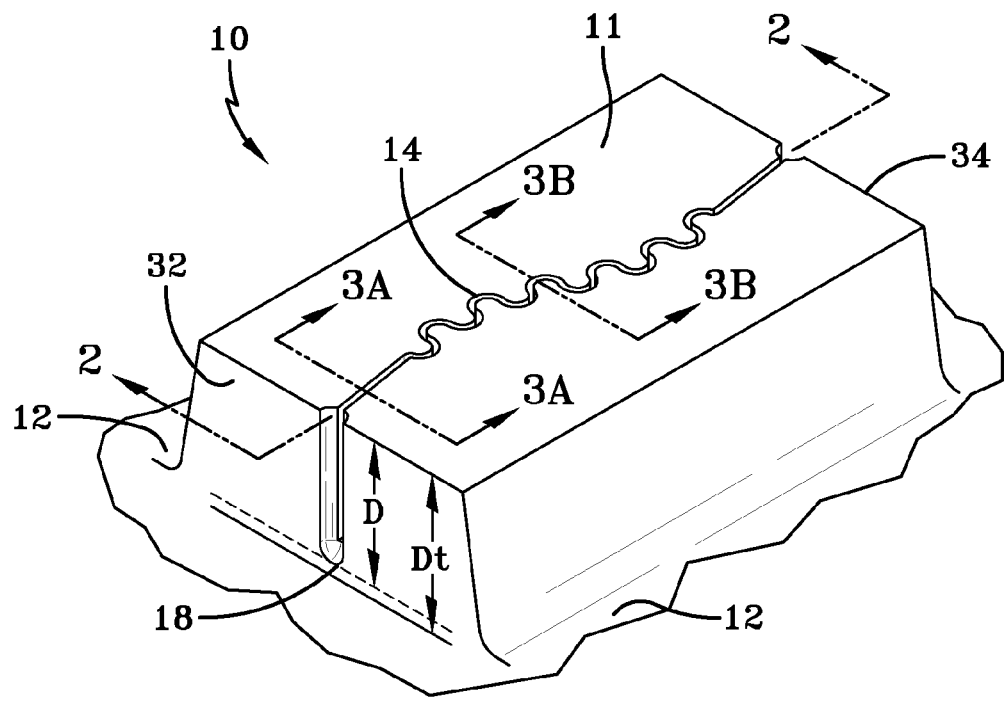
FIG. 1 is a perspective view of a tread element having a sipe in accordance with the invention.

FIG. 1 is a tread element 10 for a pneumatic tire tread. As appreciated by those skilled in the art, the tread element 10 is formed by at least one groove 12, the groove 12 being either a circumferentially extending or laterally extending groove. If the tread element 10 is defined by only circumferentially extending grooves, the tread element will be a tread rib. If the tread element 10 is formed by grooves on at least three sides, the tread element 10 is considered a tread block. The tread element 10 may be located in any position on the tread surface, i.e. along a tread shoulder, along the centerline, or an intermediate position. The depth of the grooves 12 forming the tire tread elements defines the non-skid depth Dt of the tread. If there are grooves of differing depths, the maximum groove depth will define the non-skid depth of the tread.

Located within the tread element 10 is at least one sipe 14. The sipe 14 is illustrated as subdividing the tread element 10 into two portions; however, the tread element 10 may have multiple sipes 14. The sipe orientation with respect to the tread block may be straight, curved, or have a general inclination in either the lateral or circumferential direction of the tire; the exact orientation of the sipe 14 relative to the tread is within the purview of the tread designer.

Figure 2:
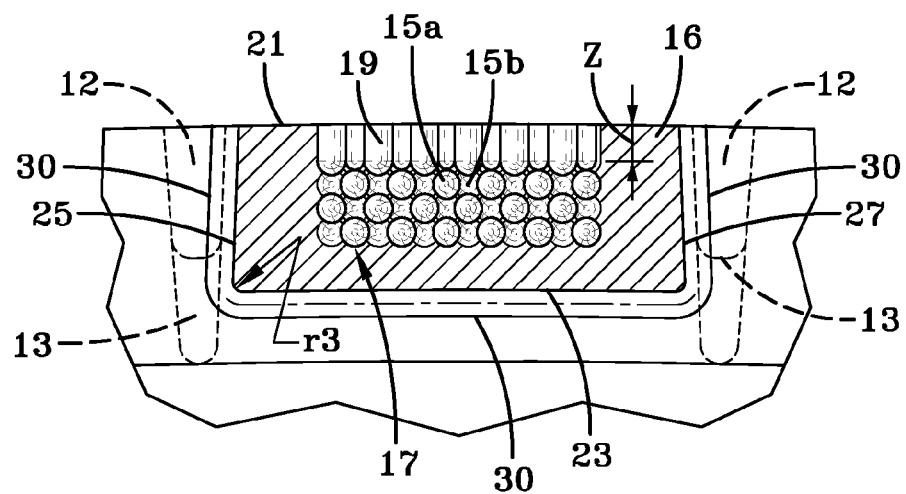
FIG. 2 is a cross-sectional view of the tread element of FIG. 1 in the direction 2-2.
Figure 3A:
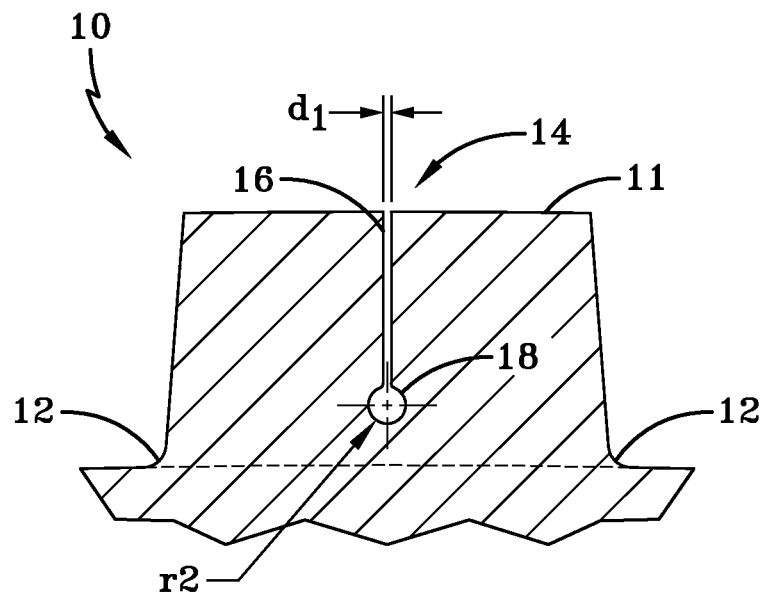
FIG. 3A is a cross-sectional view of the tread element of FIG. 1 in the direction 3A-3A.
Figure 3B:
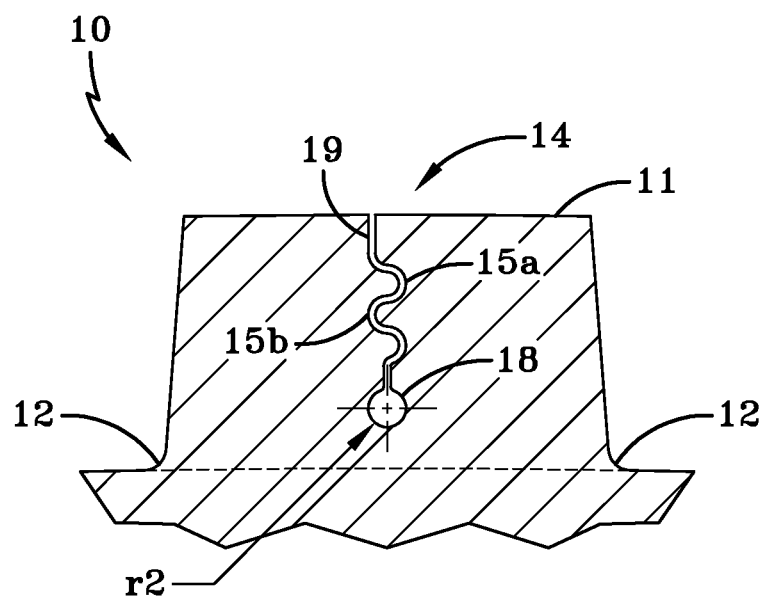
FIG. 3B is a cross-sectional view of the tread element of FIG. 1 in the direction 3B-3B.

FIG. 2 illustrates a cross-sectional view of the sipe formed in the tread block in the direction 2-2. The sipe may optionally be mounted between two grooves 12 or two tie bars 13. The sipe 14 has a first portion 16 which may be generally planar or curved as shown. The first portion 16 may also optionally comprise a section 17 having a pattern of protrusions 15a and indentations 15b in an alternating or random pattern. The first portion 16 may also optionally have a section 19 having a wavy or undulating pattern which may be positioned near the tread surface. The section 19 may have a defined depth Z, wherein Z is in the range of 1-10% of the sipe depth Dt. As shown in FIG. 3A, the first portion 16 has a general width d1 which may be in the range of about 1 to about 15 mm, more preferably about 2 to 5 mm. Preferably, the width $d_1$ is constant.

As shown in FIG. 2, the first portion 16 of the sipe has four edges: an upper edge 21 formed on the surface 11 of the tread block; a lower edge 23 located radially inward of the upper edge 21; a first lateral edge 25 located on a face 32 of the tread block, and second lateral edge 27 located on face 34 of the tread block. Lateral edge 25 is joined to lower edge 23, and lower edge 23 is joined to lateral edge 27. The lateral edges 25,27 and lower edge 23 are bounded by a continuous tubular hollow pathway 30 or void that extends along all three sides. The continuous tubular pathway does not extend along the upper edge 21. At the junction of the lateral edges with the lower edge the tubular pathway has a radiused edge of radius R3 to avoid sharp corners. R3 is in the range of about 0.5 mm to about 5 mm, and more preferably about 2 mm to about 3.5 mm. The cross-sectional shape of the tubular pathway may be circular, elliptical, bulbous or tear dropped shape with curves with no corners. For example, the tubular shape may be flask shaped with rounded edges and no corners. If the cross-sectional shape is circular and has a radius r2 as shown in FIG. 3A, the radius r2 may be in the range of about 0.5 to 5 mm, more preferably in the range of about 0.5 to about 4, and most preferably in the range of about 0.75 to about 3 mm.

Mold Blade

Figure 4:
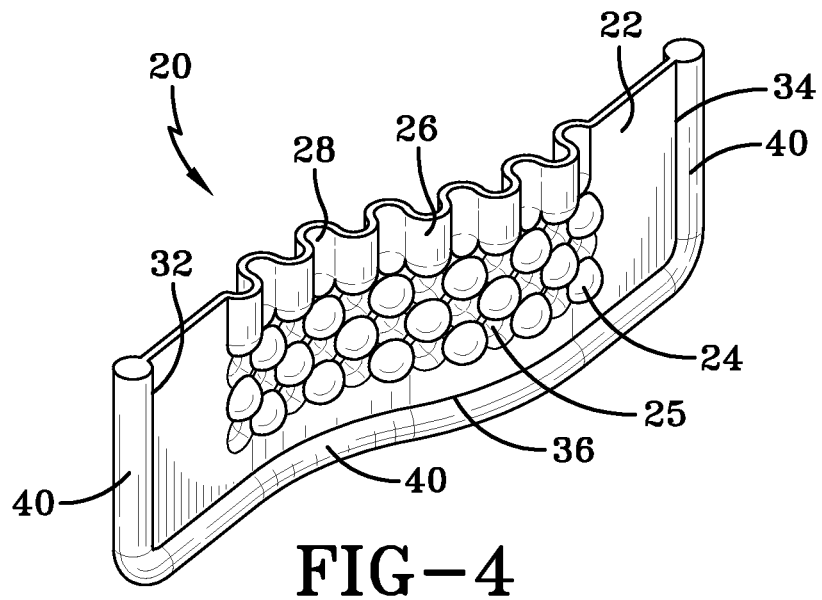
FIG. 4 is a perspective view of a blade used to form one embodiment of the invention.
Figure 5:
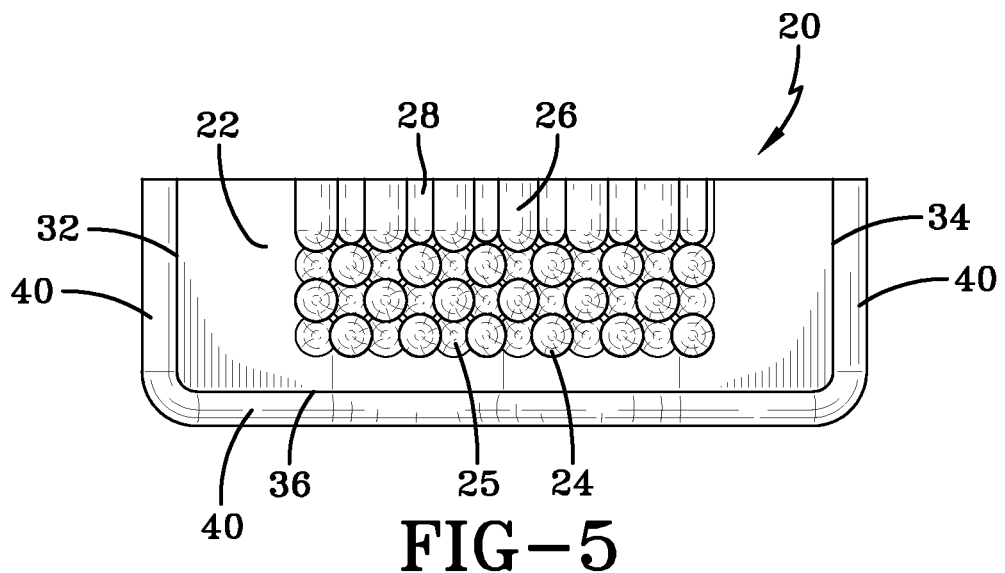
FIG. 5 is a side view of the blade of FIG. 4.
Figure 6:
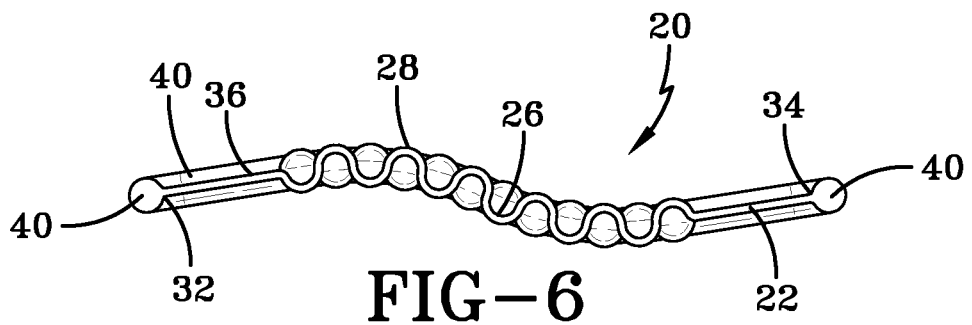
FIG. 6 is a top view of the blade of FIG. 5.
Figure 7A:
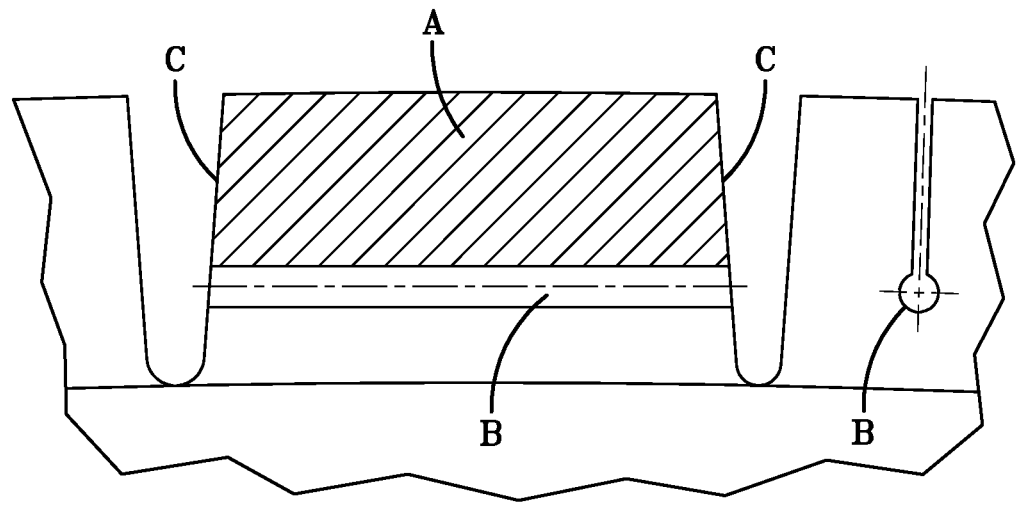
FIG. 7A is a side view of a prior art blade installed in a tread block.
Figure 7B:
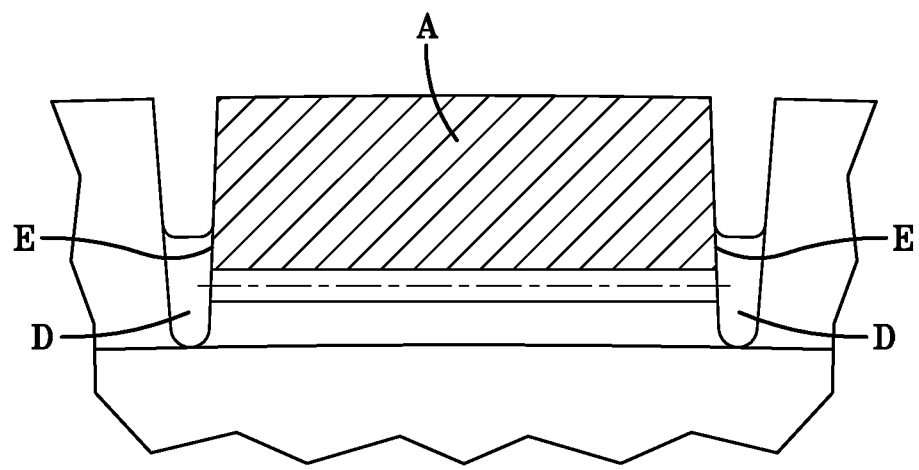
FIG. 7B is a side view of a prior art blade mounted in a tread block between tiebars.

The sipe 14 may be formed from a mold blade 20 as shown in FIGS. 4-6. During molding of the tire tread, the blade 20 forms a sipe 14 that has a profile corresponding to the blade configuration as shown in FIGS. 1-3B. Thus, in the following discussion, references to the blade pattern and dimensions are also applicable to the sipe 14 formed therefrom and may be so referred to.

The blade 20 is typically formed of metal such as steel. The blade, depending upon the shape, may be direct milled, cast, sintered or formed by stamping or embossing. The blade 20 comprises a first portion 22 that has a thickness d1 in the range of about 0.3 mm to about 0.8 mm, more preferably about 0.5 to 0.8 mm. The first portion 22 of the blade forms the first portion 16 of the sipe. The first portion of the blade has a section 24 that optionally comprises a plurality of indentations 25 and protrusions 26, typically rounded in shape and formed in a pattern. The first portion 22 of the blade may also optionally comprise a waved portion 28. Preferably, the blade thickness $d_1$ is constant in the region of the first portion surrounding the section 24; however, the thickness of the radially outer blade portion may also vary. As shown in FIGS. 4-6, the first portion 22 may be formed from a curved plate 24 having a defined length, height h and thickness $d_1$. The first portion of the blade has opposed sides 32,34 joined together by sides 36. The mold blade 20 further comprises a tubular pathway 40 that bounds the three sides of the blades 32,34,36. The tubular pathway 40 molds a hollow tubular pathway 30 in the tread element. The cross-sectional shape of the tubular pathway 40 may be a rounded, bulbous shape or, as the inventor would describe, the shape of a falling rain drop.

The tubular pathway radius $r_2$ may range from about 0.5 mm or greater, more typically about 0.5 mm to about 5 mm, and preferably about 1.5 mm to about 2.5 mm. The ratio of the transition radius to the second portion radius, $r_1/r_2$ may range from about 0.1 to about 16, and more typically about 0.3 to about 4.

While a certain representative embodiment and details have been shown for the purpose of illustrating the invention, it will be apparent to those skilled in the art that various changes and modifications may be made therein without departing from the spirit or scope of the invention.

What is claimed is:

1. A tire tread, the tread having at least one circumferentially extending or laterally extending main groove, the maximum radial depth of the at least one main groove defining a non-skid tread depth, the at least one main groove partially forming at least one tread element, the at least one tread element having a sipe therein,
   wherein the sipe has a first portion having a first and second opposed side, and a third side joining said first and second side, and said sipe further including a continuous tubular pathway bordering said first, second and third side, wherein the first portion has a section having a three dimensional configuration comprises a series of protrusions and recesses.

2. A tire tread, the tread having at least one circumferentially extending or laterally extending main groove, the maximum radial depth of the at least one main groove defining a non-skid tread depth, the at least one main groove partially forming at least one tread element, the at least one tread element having a sipe therein
   wherein the sipe has a first portion having a first and second opposed side, and a third side joining said first and second side, and said sipe further including a continuous tubular pathway extending along the third side and partially extending along at least one of the first and second side, wherein the first portion has a first section having a three dimensional configuration comprises a series of protrusions and recesses.

3. The tread of claim 1 or 2 wherein the tubular pathway is hollow.

4. The tread of claim 1 wherein the first portion has a substantially straight configuration.

5. The tread of claim 1 or 2 wherein the first portion of the sipe has a non-straight configuration.

6. The tread of claim 1 or 2 wherein the thickness of the tubular pathway is greater than the thickness of the first portion.

7. The tread of claim 1 or 2 wherein the thickness of the tubular pathway is at least three times greater than the thickness of the first portion.

8. The tread of claim 1 or 2 wherein the first portion has a section having a wavy configuration.

9. A blade for molding a tire, the blade comprising a first portion having a first and second opposed side, and a third side joining said first and second side, and said blade further including a continuous tubular pathway extending along the third side and partially extending along at least one of the first and second side, wherein the first portion has a three dimensional configuration with projections and recessed portions.

10. The blade of claim 9 wherein the tubular pathway has a circular cross-sectional shape.

11. The blade of claim 9 wherein the continuous tubular pathway extends along the first, second and third side of the blade.

12. The blade of claim 9 wherein the continuous tubular pathway does not extend along the fourth side of the blade.

13. The blade of claim 9 wherein the blade has a length that is angled or curved with respect to its length.

14. The blade of claim 9 wherein the continuous tubular pathway is solid.

* * * * *